United States Patent

[11] 3,614,507

| | | |
|---|---|---|
| [72] | Inventors | Wilhelmus Jacobus Witteman;<br>Pieter Zalm, both of Emmasingel,<br>Eindhoven, Netherlands |
| [21] | Appl. No. | 797,070 |
| [22] | Filed | Feb. 6, 1969 |
| [45] | Patented | Oct. 19, 1971 |
| [73] | Assignee | U.S. Philips Corporation<br>New York, N.Y. |
| [32] | Priority | Feb. 15, 1968 |
| [33] | | Netherlands |
| [31] | | 6802135 |

[54] DEVICE FOR PRODUCING STIMULATED INFRARED EMISSION, IRASER, BY MEANS OF AN ELECTRIC DISCHARGE IN A GAS MIXTURE CONSISTING PARTLY OF CARBONIC ACID GAS, AND DISCHARGE TUBE DESTINED FOR SUCH A DEVICE
2 Claims, 1 Drawing Fig.

[52] U.S. Cl. .................................................. 313/174,
 315/108, 331/94.5
[51] Int. Cl. .................................................. H01j 17/26,
 H01j 61/24
[50] Field of Search .......................................... 313/174;
 315/108; 331/94.5; 206/0.4

[56] References Cited
UNITED STATES PATENTS

| | | | |
|---|---|---|---|
| 2,427,732 | 9/1947 | Mason .......................... | 313/174 |
| 2,882,244 | 4/1959 | Milton .......................... | 206/0.4 UX |
| 3,452,286 | 6/1969 | Adler ........................... | 331/94.5 X |

FOREIGN PATENTS

| | | |
|---|---|---|
| 6,509,730 | 1/1967 | Netherlands ................ |

OTHER REFERENCES

Article Entitled, " Increasing Continuous Laser-action on CO 2 Rotational Vibrational Transitions Through Selective Depopulation of the Lower Laser Level By Means Of Water Vapor," by W. J. Witteman, Appearing in Physics Letters, Vol. 18, No. 2, Pages 125– 127, Aug. 15, 1965.

Primary Examiner—Roy Lake
Assistant Examiner—Palmer C. Demeo
Attorney—Frank R. Trifari ABSTRACT: The efficiency of an iraser with a discharge in carbonic acid, helium, nitrogen, and water vapor reduces after a few hundreds of hours. This is prevented by contacting the gas filling with a substance which contains water with the correct vapor pressure, and by ensuring the supply of water vapor which has disappeared by absorption in the wall and in the electrodes. A suitable material is, for example, zeolite.

PATENTED OCT 19 1971 3,614,507
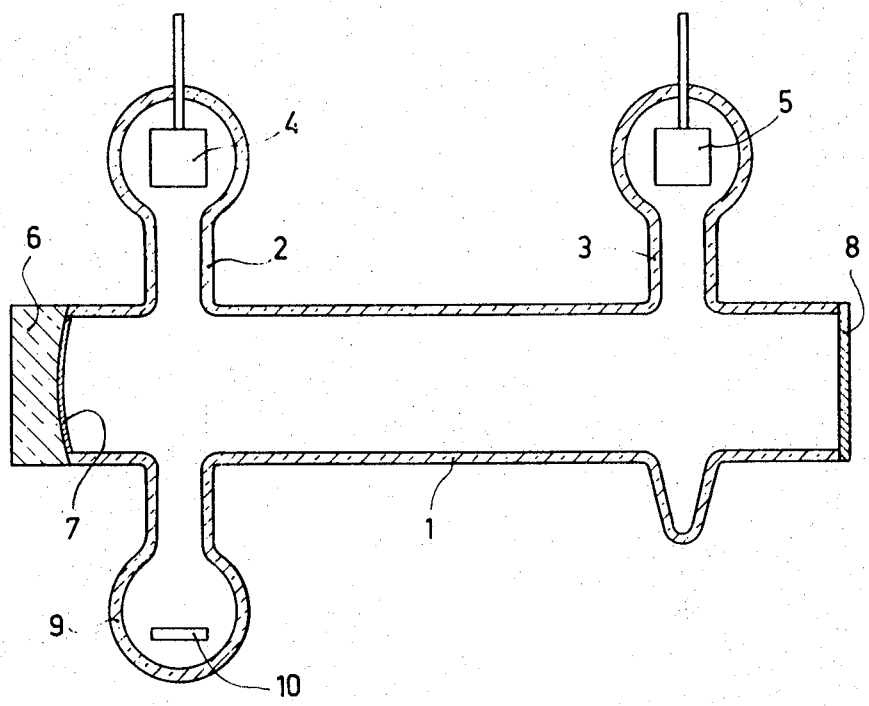
INVENTOR.
WILHELMUS J. WITTEMAN
PIETER ZALM
BY
AGENT

DEVICE FOR PRODUCING STIMULATED INFRARED EMISSION, IRASER, BY MEANS OF AN ELECTRIC DISCHARGE IN A GAS MIXTURE CONSISTING PARTLY OF CARBONIC ACID GAS, AND DISCHARGE TUBE DESTINED FOR SUCH A DEVICE

The invention relates to a device for producing stimulated infrared emission, an iraser, by means of an electric discharge in a gas mixture consisting of carbonic acid, nitrogen, helium, and water vapor. The invention furthermore relates to an electric discharge tube destined for such a device.

The addition of water vapor to the gas filling is known from Dutch Pat. application No. 6,602,290, to that without helium from Dutch Pat. application No. 6,509,730. The pressure of the water vapor lies between approximately 0.1 and 0.8 torr. Due to the presence of water vapor the efficiency of the iraser and the irradiated power increase strongly.

Instead of adding water vapor, it is also possible to add hydrogen with a pressure of approximately 0.2 torr to the gas filling. The hydrogen forms water vapor with the oxygen residues which are always present. This addition is known from W. J. Witteman, Appln. Phys. Letters, Dec. 1967, pg, 333.

The presence of water vapor and hydrogen, respectively, is of great importance for the continuous regeneration of the desired gas mixture; in the absence of this addition the lifetime is at most a few tens of hours.

It has actually been found that after prolonged operation the water vapor pressure no longer has the most favorable value, and the irradiated power deteriorates considerably, while the carbonic acid gas strongly dissociates. This is to be ascribed to absorption of water vapor in the wall of the discharge tube and/or the electrodes. The solution to this lifetime problem cannot be found by making the initial pressure of the water vapor extra high or by adding extra hydrogen. This is associated with the fact that the irradiated power decreases very strongly if the pressure of the water vapor is higher than approximately 0.3 torr.

It is the object of the invention to provide an iraser which has advantages as compared with the known devices.

In a device according to the invention for producing stimulated infrared emission, an iraser, by means of an electric discharge in a gas mixture consisting of carbonic acid, nitrogen, helium, and water vapor, the gas filling of the discharge tube in which the discharge takes place is in contact with a substance saturated entirely or partly with water, over which substance a water vapor pressure prevails which lies between approximately 0.1 and 0.3 torr.

It is possible with a water store of low vapor pressure provided in this manner that the water vapor pressure maintains the minimum value for a very long time which is required for a high efficiency and for regeneratng the carbonic acid gas, in is present absorption of water in the wall of the tube and in the electrodes, as a result of which the lifetime becomes very long.

A suitable material for absorbing the store of water is, for example, zeolite, which in a small quantity can contain already at least two orders of magnitude, or in other words, one to a few times the hundredfold of the quantity of water which s preset in vapor form at the most favorable pressure in the tube. The absorption which this material shows for carbonic acid is low. The water-absorbing material is preferably arranged in a side tube of the discharge space.

In order that the invention may be readily carried into effect, it will now be described in greater detail, by way of example, with reference to the accompanying drawing, the sole FIGURE of which diagrammatically sows a discharge tube according to the invention.

In this FIGURE, reference numeral 1 denotes a quartz tube, 1.5 meter long, 20 mm. inside diameter. In side tubes 2 and 3 platinum cylinders 4 and 5 are arranged as electrodes. On the left-hand side the tube 1 is sealed in a vacuumtight manner by means of the concave quartz block 6, radius of curvature 2.4 m., coated with a layer of gold 7. The sealing on the other side is formed by a flat germanium plate 8, 2 mm. thick.

A rod of zeolite 10, 5 mm. long, 2 mm. thick, is present in the side tube 9. After degassing the tube 1 through the exhaust tube 11, water vapor is admitted at a pressure of 30 torr. After some time this is entirely absorbed in the zeolite rod 10, thus creating a saturated condition in the zeolite rod. The quantity is approximately 1.5 mgms. The gas filling consisting of 2 torr. $CO_2$ 2.5 torr. $N_2$ and 11 torr. He is then admitted to the tube.

With a discharge current of 40 ma. and an operating voltage of nearly 14 volts, a coherent beam with a wavelength of 10.6 $/\mu$ can emerge from the window 8 with an intensity of 60 watts. The efficiency hence is well over 10 percent. The lifetime will be several thousands of hours.

What is claimed is:

1. A device for producing stimulated infrared emission comprising a gas-filled discharge tube for supporting an electric discharge in a gas mixture consisting of carbonic acid, nitrogen, helium, and water vapor, said gas filling in the discharge tube being in contact with a substance in a water-saturated condition, above which substance a water vapor pressure prevails which lies between approximately 0.1 to 0.3 torr., wherein said substance is a quantity of zeolite containing a quantity of water which is at least two orders of magnitude greater than the water vapor present in the tube.

2. A device for producing stimulated emission comprising a gas-filled discharge tube, means for initiating an electric discharge in said tub, a side tube coupled to said discharge tube and exposed to the discharge area of said tube, said side tube including a quantity of zeolite in a water saturated condition, said gas filling comprising 2 torr. $CO_2$ 2.5 torr. $N_2$, 11 torr. He and between 0.1 and 0.3 torr. of water vapor.